US008047234B2

(12) United States Patent
Takada et al.

(10) Patent No.: US 8,047,234 B2
(45) Date of Patent: Nov. 1, 2011

(54) VALVE APPARATUS

(75) Inventors: Hideyuki Takada, Koshigaya (JP); Yoshihiko Ito, Abiko (JP)

(73) Assignee: SMC Kabushiki Kaisha, Tokyo (JP)

( * ) Notice: Subject to any disclaimer, the term of this patent is extended or adjusted under 35 U.S.C. 154(b) by 1054 days.

(21) Appl. No.: 11/871,182

(22) Filed: Oct. 12, 2007

(65) Prior Publication Data

US 2008/0087346 A1 Apr. 17, 2008

(30) Foreign Application Priority Data

Oct. 12, 2006 (JP) ................................ 2006-279217

(51) Int. Cl.
*F16K 11/10* (2006.01)

(52) U.S. Cl. ....................................................... 137/884

(58) Field of Classification Search ................... 137/884
See application file for complete search history.

(56) References Cited

U.S. PATENT DOCUMENTS

| | | | | | |
|---|---|---|---|---|---|
| 4,230,143 | A | * | 10/1980 | Dettmann et al. | 137/270 |
| 4,353,392 | A | | 10/1982 | Ruchser et al. | |
| 4,485,846 | A | * | 12/1984 | Neff | 137/625.64 |
| 4,587,991 | A | * | 5/1986 | Chorkey | 137/454.6 |
| 5,275,420 | A | * | 1/1994 | Rodenkirch | 277/313 |
| 5,664,789 | A | | 9/1997 | Hayashi | |
| 5,699,834 | A | | 12/1997 | Hayashi et al. | |
| 5,996,610 | A | * | 12/1999 | Sato et al. | 137/271 |
| 6,048,041 | A | | 4/2000 | Mueller et al. | |
| 6,102,074 | A | * | 8/2000 | Bouteille | 137/884 |
| 6,109,298 | A | * | 8/2000 | Kaneko et al. | 137/551 |
| 6,206,045 | B1 | | 3/2001 | Hayashi et al. | |
| 6,216,740 | B1 | | 4/2001 | Hayashi et al. | |
| 6,453,948 | B2 | | 9/2002 | Notz et al. | |
| 6,488,051 | B2 | * | 12/2002 | Fagerstrom | 137/884 |
| 6,505,642 | B2 | | 1/2003 | Miyazoe et al. | |
| 7,252,116 | B2 | | 8/2007 | Miyazoe et al. | |
| 2007/0137708 | A1 | | 6/2007 | Kuhbauch et al. | |

FOREIGN PATENT DOCUMENTS

| | | |
|---|---|---|
| CN | 1155638 | 7/1997 |
| CN | 1268639 | 10/2000 |
| CN | 1342859 | 4/2002 |
| CN | 1690494 | 11/2005 |
| EP | 0 667 472 | 8/1995 |
| JP | 56-037077 | 8/1981 |
| JP | 08-093942 | 4/1996 |
| JP | 2000-274542 | 10/2000 |
| JP | 2000-291601 | 10/2000 |
| JP | 2001-032956 | 2/2001 |
| JP | 2001-254859 | 9/2001 |
| JP | 2004-108419 | 4/2004 |
| JP | 2007-170669 | 7/2007 |
| KR | 10-2004-0078150 | 9/2004 |
| KR | 10-2006-0094863 | 8/2006 |
| WO | 97/10979 | 3/1997 |

* cited by examiner

*Primary Examiner* — John Fox
(74) *Attorney, Agent, or Firm* — Paul A. Guss

(57) ABSTRACT

A valve apparatus includes a first base block having flow passages formed therein, a second base block and a control block. By connecting together side surfaces of the blocks so that the surfaces mutually oppose one another, a manifold formed in the interior of each of the blocks is configured and connected, and valves are installed internally in the first base block and the second base block. Further, gaskets are gripped between each of the interconnected parts, wherein the gaskets are held in a state of being flush with or protruding with respect to outer surfaces of the blocks that are positioned on both sides of the gaskets.

9 Claims, 14 Drawing Sheets

14

VALVE APPARATUS

BACKGROUND OF THE INVENTION

1. Field of the Invention

The present invention relates to a valve apparatus having internally installed valves, wherein the valve apparatus includes a block having flow passages formed therein and another block, the blocks being connected together while gripping a seal member therebetween.

2. Description of the Related Art

In food processing devices and the like that are used at food manufacturing sites, for example, it is essential to perform cleaning and disinfecting operations using water and/or water-based cleansers. Accordingly, a fluid pressure driven device such as a fluid pressure cylinder or the like is integrated within such food processing devices, wherein water resistance of the fluid pressure driven device also is necessary.

The fluid pressure driven device is driven by supplying air, for example, as a driving pressure fluid (operating fluid). In this case, it is generally conventional to arrange a valve apparatus, which serves to appropriately switch the destination of flow of the fluid with respect to the fluid pressure driven device, in the vicinity of the fluid pressure driven device. Accordingly, in the food processing device or the like, it also becomes necessary for the valve apparatus to be water resistant.

Incidentally, in this type of valve apparatus, there are generally a large number of joints and gaps that interconnect a plurality of valves. In the case of a food processing device or the like, liquid and solid materials can become trapped and collect within surface irregularities produced by such joints and gaps. Accordingly, in the case that cleaning is performed using a high pressure cleaning apparatus to clean and remove such collected liquids and solids from the irregular surface portions of such joints and gaps, water and detergents enter into the interior of the valve unit, raising the possibility that damage may occur to the valve unit.

In Japanese Laid-Open Patent Publication No. 2001-254859, a solenoid manifold for use in a food processing device is proposed, in which by individually placing the valves one-by-one within a casing in a capsule form, a manifold valve is structured in which the accumulation and retention of liquids does not occur. In this case, a waterproof seal member is arranged between surfaces of the casing and the valve mounts.

Notwithstanding, with the structure disclosed in Japanese Laid-Open Patent Publication No. 2001-254859, in order to prevent accumulation and retention of liquids between each of the valve units (capsules), it is essential for the pitch between each of the valve units to be sufficiently wide, causing a problem that the valve apparatus becomes large in size. In the aforementioned manner, liquids such as collected water, detergents and the like elicit propagation of unwanted bacteria, raising concerns about health and sanitation.

Furthermore, in this type of valve apparatus, which is intended to improve water resistance, although on the one hand the apparatus is highly hermetic and airtight, numerous inconveniences related to disassembly, and in particular maintenance, of the apparatus occur. For example, in the event that a specified valve needs to be exchanged, the replacement operation therefor is quite complicated.

SUMMARY OF THE INVENTION

A general object of the present invention is to provide a valve apparatus, which is small in size while preventing accumulation and retention of liquids on the outer surfaces thereof, thereby making it possible to avoid problems associated with hygiene and sanitation.

Further, a principal object of the present invention is to provide a valve apparatus in which maintenance thereon can be improved, while at the same time ensuring water resistance.

According to an embodiment of the present invention, a valve apparatus is provided comprising a plurality of blocks having flow passages formed therein, wherein by connecting together side surfaces of each of the blocks so that the surfaces thereof mutually oppose one another, the flow passages of each of the blocks communicate with each other, and wherein a valve communicating with the flow passages is installed internally in at least one of the plurality of blocks. A seal member is gripped between respective connecting parts of each of the blocks, wherein the seal member is held in a state of being flush with or protruding with respect to outer surfaces of the blocks that are positioned on both sides of the seal member.

As a result of such a structure, the tip of the seal member, which is gripped in between connecting portions of each of the blocks, is not held in a state in which it is recessed from the outer surfaces of the blocks, and moreover, each of the blocks is arranged in tight contact therewith. Accordingly, together with ensuring miniaturization and water resistance of the valve apparatus, water and detergents or the like that are used for cleaning operations of the valve apparatus do not accumulate on the outer surfaces or at the connecting portions of the blocks, so that propagation of unwanted bacteria can be avoided.

Further, the aforementioned seal member includes a first seal portion fitted into a groove formed along an exterior shape of each side surface of the blocks between which the seal member is gripped, and a second seal portion disposed on an outer side of the first seal portion and abutting with an edge portion making up the exterior shape, whereby water resistance of the valve apparatus can be even further improved.

Furthermore, a cover is detachably disposed on one side surface of the block in which the valve is installed, for closing an opening through which the valve is inserted and extracted, wherein a tapered portion, which expands in width toward an outer surface side thereof, is formed in a side surface of the cover that contacts the seal member, and/or a part of the second seal portion that contacts the cover is formed in a tapered shaped that narrows in width toward an outer surface side thereof. Accordingly, even in a state in which the blocks are connected sandwiching the seal member therebetween, attachment and detachment of the cover can be smoothly carried out.

Moreover, the valve apparatus further includes a cover detachably disposed on one side surface of the block in which the valve is installed, for closing an opening through which the valve is inserted and extracted, a hole disposed in the cover, a hole disposed in the valve, which is aligned coaxially with respect to the hole of the cover, and a screw for fixing the valve to the block by threaded engagement with female threads provided in the block, after the screw has been inserted from an upper surface side of the hole of the cover, and inserted through each of the holes of the cover and the valve. A screw portion is formed over a predetermined length from an end of the screw, and female threads, into which the screw portion formed in the screw can be threaded, are formed in at least a portion of an inner circumferential surface of the hole disposed in the valve. Thus, even with a compact structure, in which the blocks are connected while sandwiching the seal member therebetween, it is possible for the valve to be easily taken out together with the cover.

Still further, since a tapered portion, which expands in width toward an outer surface side thereof, is formed in a side surface of the cover that contacts the seal member, the cover and the valve can be taken out even more easily and smoothly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
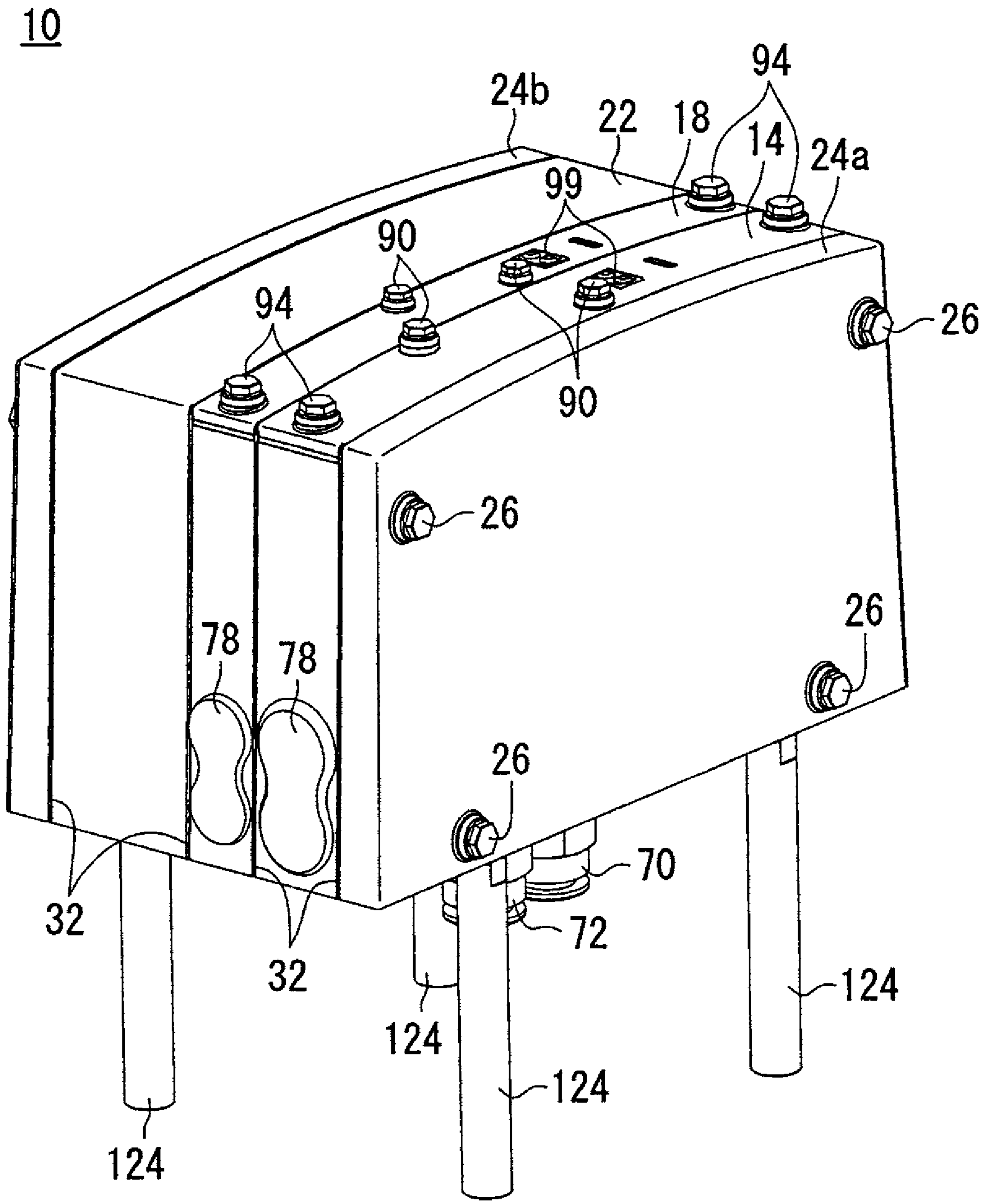
FIG. 1 is a perspective view of a valve apparatus according to an embodiment of the present invention.

A preferred embodiment of the valve apparatus according to the present invention shall be described in detail below with reference to the accompanying drawings.

The valve apparatus 10 according to the present invention supplies a pressure fluid (for example, air or liquid) with respect to a fluid pressure driven device, such as a fluid pressure cylinder or the like, which is loaded, for example, into a food processing device. The valve apparatus 10 controls switching of a pressure fluid, which is introduced from an unillustrated fluid pressure supply source, and is capable of selectively supplying the pressure fluid to a plurality of fluid pressure driven devices. Hereinbelow, the present invention shall be described taking as an example a case in which air is used as the pressure fluid.

The valve apparatus 10 includes a first base block 14 in which a valve 12 is installed, a second base block 18 in which a valve 16 is installed, and a control block 22 in which a control substrate 20 that controls driving of the valves 12, 16 is installed. The first base block 14, the second base block 18 and the control block 22 are connected together such that side surfaces thereof mutually face one another, with the second base block 18 being sandwiched between and gripped by the first base block 14 and the control block 22. Furthermore, a pair of end plates 24*a*, 24*b* are connected to the first base block 14 and the control block 22, on side surfaces thereof opposite from the sides that are connected to the second base block 18.

Figure 2:
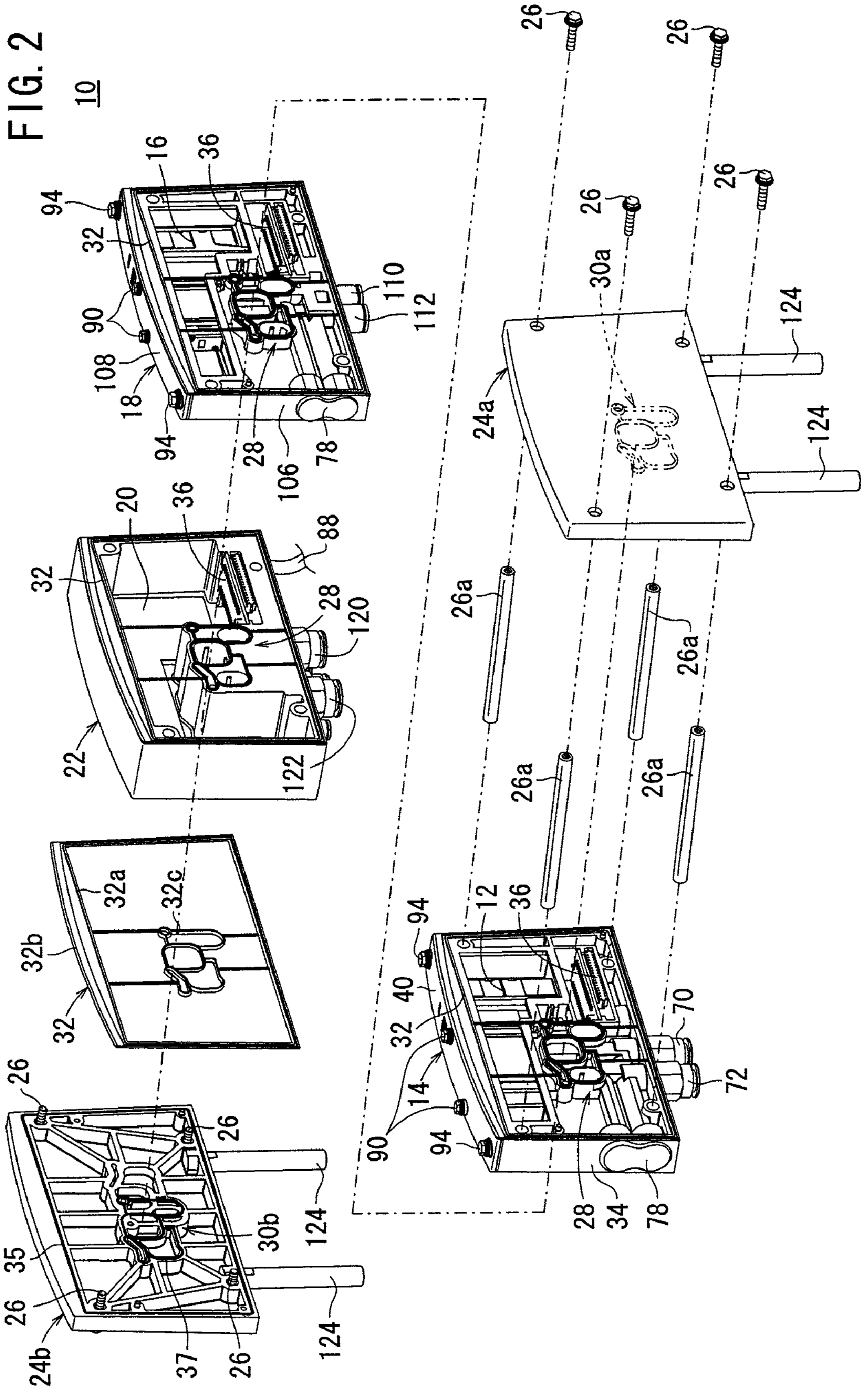
FIG. 2 is an exploded perspective view of respective structural components, in a disassembled state, of the valve apparatus shown in FIG. 1.

The first base block 14, the second base block 18, the control block 22 and the end plates 24*a*, 24*b* have different widths in the lateral directions thereof, however, the outer shapes thereof are roughly the same. That is, in the valve apparatus 10, a block formation is formed wherein a stacked body, in which the first base block 14, the second base block 18, and the control block 22 are aligned and connected in series, is sandwiched between the pair of end plates 24*a*, 24*b*, and the block formation is connected together integrally by means of bolts 26. In the case of the present embodiment, the bolts 26 are so-called tension bolts, and as shown in FIG. 2, the bolts 26 are connected from both respective ends of sleeves 26*a* having a length that penetrates through each of the blocks and each of the plates. In this case, concerning the length of the sleeves 26*a*, segmented lengths that correspond to the lengths of each of the first base blocks 14, etc., may be connected together and used. The bolts 26 also are not limited to the aforementioned tension bolts, insofar as they are capable of connecting the valve apparatus 10.

Manifolds 28, which penetrate along the connecting directions thereof, are formed respectively substantially in center portions of the first base block 14, the second base block 18 and the control block 22. Accordingly, when the first base block 14, the second base block 18 and the control block 22 are connected, respective end surfaces of each of the manifolds 28 are placed in intimate contact communicating with each other, thereby functioning as a manifold 28 that extends in the connecting direction of the valve apparatus 10. Moreover, in the manifold 28, five flow passages are arranged in parallel, wherein air or the like that makes up the pressure fluid flows internally therethrough, the details of which shall be described later on.

Manifold ends 30*a*, 30*b*, which have substantially the same shape as the manifold 28 itself, are formed in the end plates 24*a*, 24*b* at positions corresponding to the manifold 28. The manifold ends 30*a*, 30*b* serve to close both ends of the respective flow passages constituting the manifold 28.

Gaskets 32 are gripped between respective connecting portions in the valve apparatus 10, for example, between the connecting portions of the first base block 14 and the second base block 18. The gaskets 32 prevent permeation of water or detergent into the interior of the valve apparatus 10 from the connecting portions. That is, the gaskets 32 are used as sealing members for improving water resistance of the valve apparatus 10. Furthermore, the gaskets 32 reliably place the communicating portions (connecting portions) of the flow passages of each of the manifolds 28 in intimate contact, and function to prevent leakage of air or the like at the communicating portions, as well as to prevent mixing of air or the like between respective flow passages of the manifold 28.

As shown in FIGS. 1 and 2, apart from being arranged between the connecting portions of the first base block 14 and the second base block 18, naturally the gaskets 32 also are arranged between the connecting portions of the end plate 24*a* and the first base block 14, the connecting portions of the second base block 18 and the control block 22, and the connecting portions of the control block 22 and the end plate 24*b*.

Figure 4:
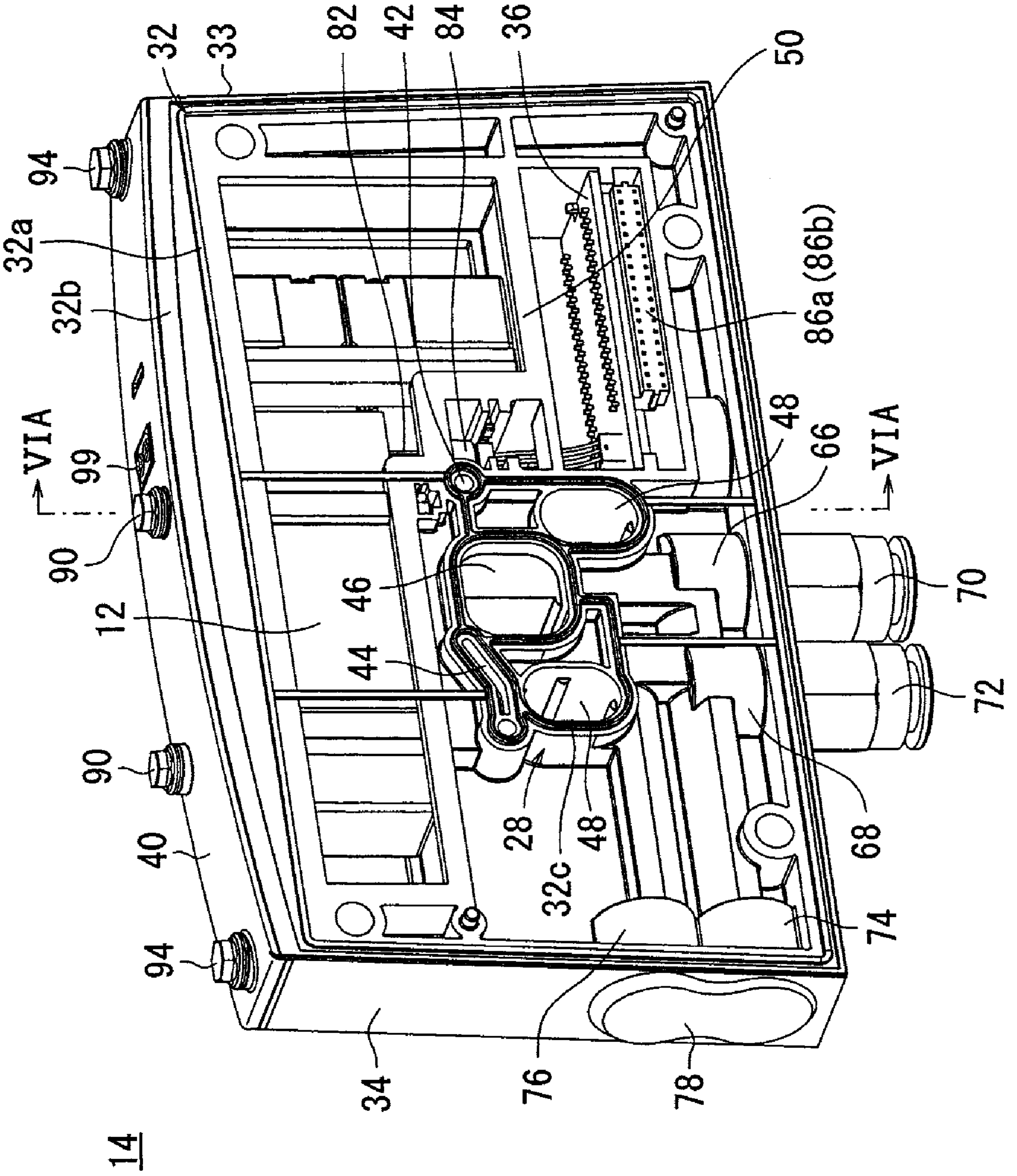
FIG. 4 is a perspective view of a first base block illustrated in FIG. 2.
Figure 5:
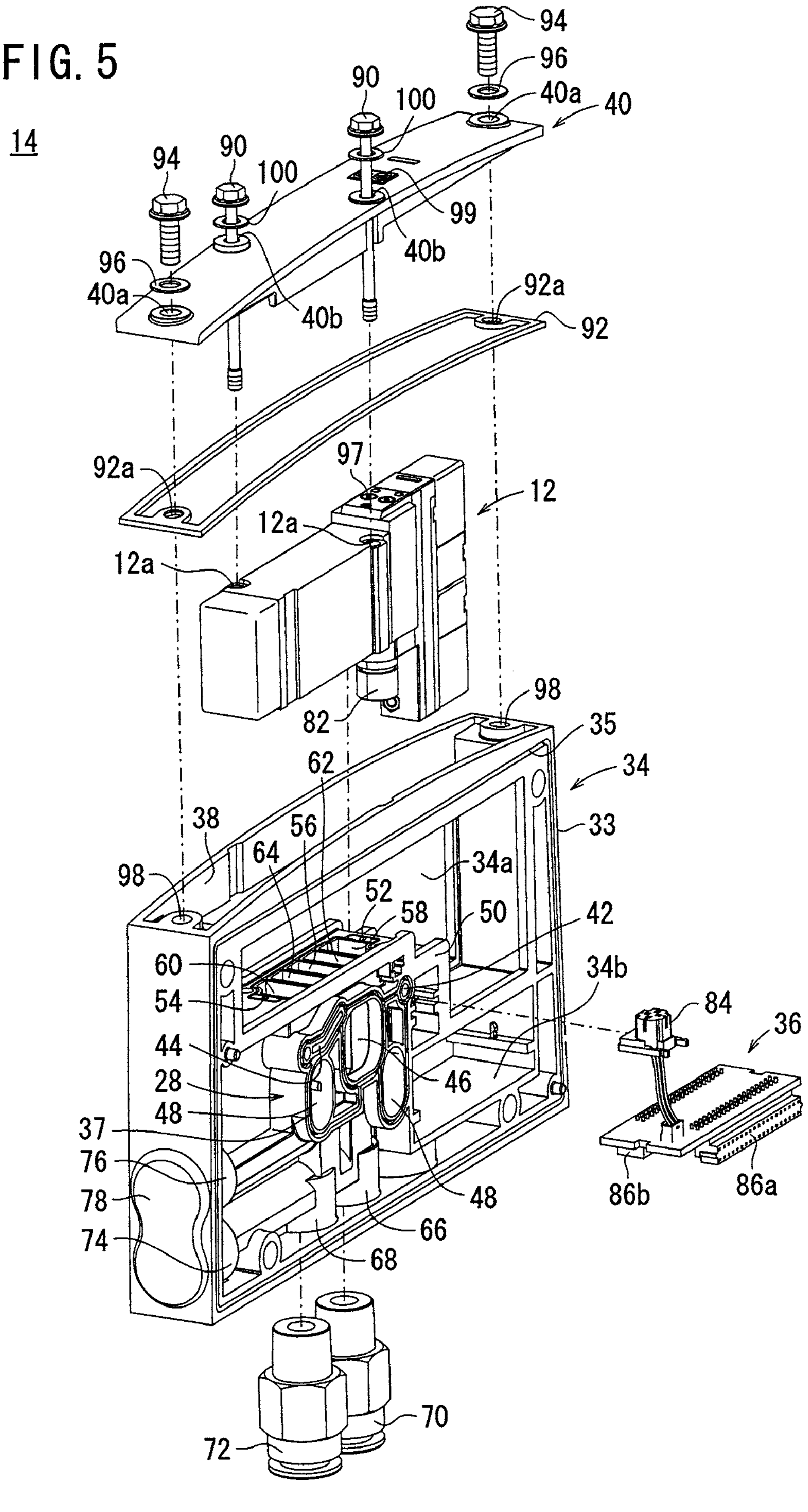
FIG. 5 is an exploded perspective view of respective structural components, in a disassembled state, of the first base block shown in FIG. 4.

As shown in FIGS. 4 and 5, the first base block 14 comprises a base 34 that defines a frame forming the outer shape of the base block 14, a valve 12 installed inside the base 34, a substrate (printed circuit board) 36 connected electrically to the valve 12, and a cover 40, which closes an opening 38 formed in an upper surface side of the base 34.

In the base 34, the greater portion of both side surfaces that are connected to the second base block 18 or the like are open, and a groove 35 is formed in a surrounding manner along the outer shape of the side surfaces (see FIG. 5). The groove 35 is formed slightly more inwardly than the edge portion (corner) 33 constituting the outer shape of the side surface, and the first seal portion 32*a* of the gasket 32 (to be described later) is fitted therein.

A manifold 28, made up of five flow passages arranged in parallel that penetrate in a widthwise direction of the base 34, is disposed in a substantially central portion of the base 34.

From among the five flow passages constituting the manifold 28, two small-diameter flow passages make up pilot flow passages, through which pilot air flows for driving main valves (not shown) of the valves 12 and 16. As shown in FIG. 4, the pilot flow passages include a substantially circularly shaped pilot supply flow passage 42 that supplies pilot air to the valves 12, 16, and a bent and flattened pilot discharge flow passage 44 through which pilot air is discharged after the valves 12, 16 have been driven.

On the other hand, among the five flow passages constituting the manifold 28, the remaining three larger diameter flow passages function as air passages (pressure fluid flow passages), through which air, which makes up the pressure fluid, flows for driving an unillustrated fluid pressure driven device. As shown in FIG. 4, the air passages are disposed in a substantially central portion of the manifold 28, and include a roughly rectangular shaped supply flow passage 46 for supplying air to the valves 12, 16, and substantially elliptically shaped discharge flow passages 48, 48 disposed on both sides of the supply flow passage 46, which discharge air, the continued supply of which is unnecessary for the fluid pressure driven device, after air has been supplied to the valves 12, 16 by the supply flow passage 46.

Further, the base 34 includes a center frame 50, formed in a stepped shape, longitudinal ends of which are connected substantially centrally, and which penetrates through an upper portion of the manifold 28. The valve 12 is installed in a substantially L-shaped space 34*a*, at an upper side partitioned by the center frame 50, and a substrate 36 is installed in a roughly rectangular shaped space 34*b*, at a lower side partitioned by the center frame 50.

As shown in FIG. 5, in the space 34*a* where the valve 12 is installed, two small diameter flow passages 52, 54 and five large diameter flow passages 56, 58, 60, 62, 64, which are disposed between the flow passages 52 and 54, open from the side of the manifold 28. Each of the flow passages 52, 54, 56, 58, 60, 62 and 64 are formed so as to penetrate through the center frame 50.

Figure 13:
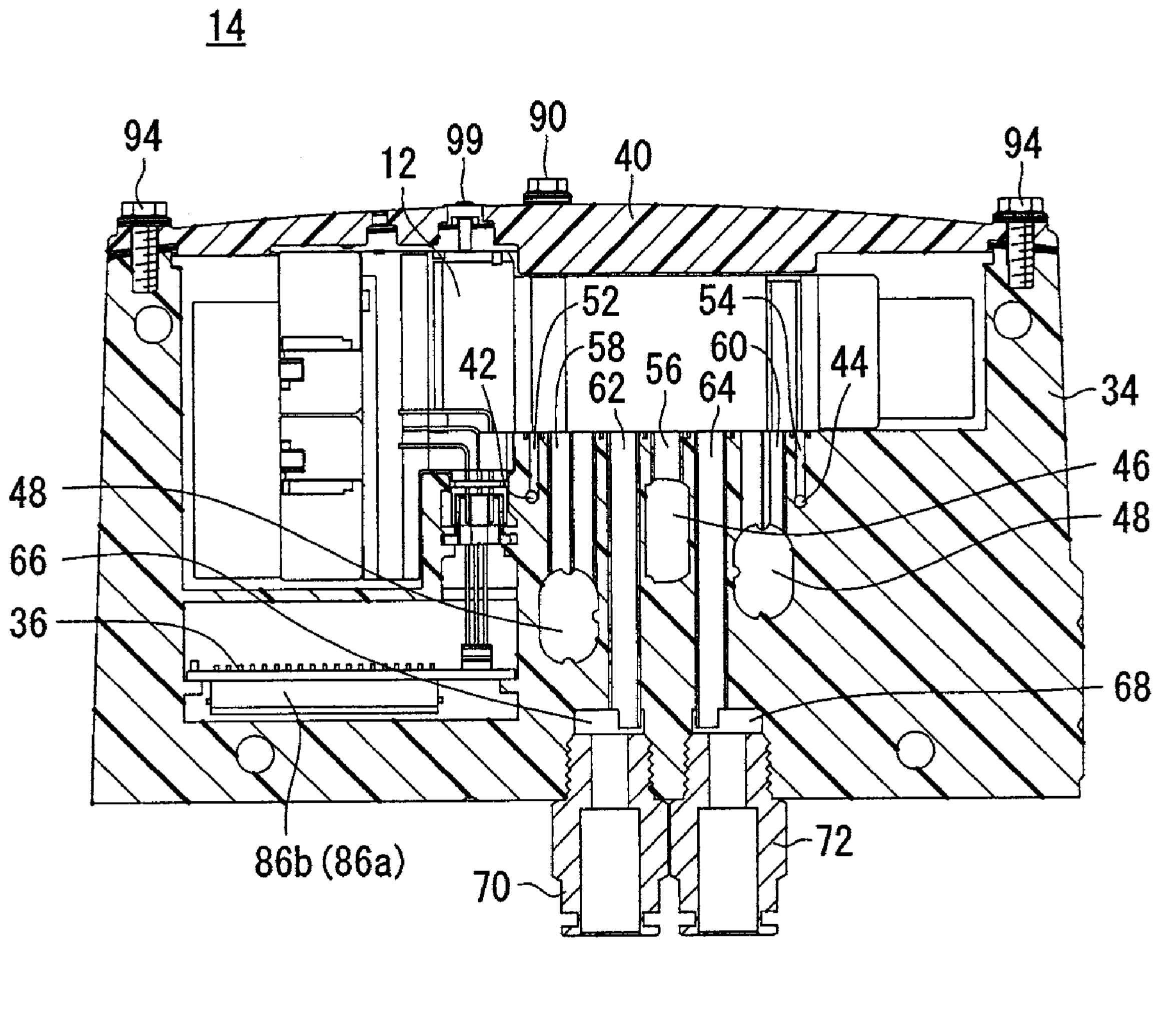
FIG. 13 is a cross sectional view with partial omission taken along line XIII-XIII in FIG. 8A.

In this case, the flow passages 52, 54 communicate respectively with the pilot supply flow passage 42 and the pilot discharge flow passage 44 (see FIG. 13). The flow passage 56 communicates with the supply flow passage 46, and the flow passages 58, 60 communicate respectively with the discharge flow passages 48, 48. Further, the flow passages 62, 64, communicate respectively with two outlet ports 66, 68 that open on a lower surface of the base 34 from a lower portion of the manifold 28 (see FIG. 13).

Couplings 70, 72 communicate with the outlet ports 66, 68. Pipes (not shown) are connected to the couplings 70, 72, wherein other ends of the pipes are connected to the fluid pressure driven device.

In the present embodiment, as described above, the flow passages 62, 64 communicate respectively with the outlet ports 66, 68, however the flow passages 62, 64 also can communicate with other outlet ports 74, 76, which are formed to face a narrow side surface (the side surface on the front side as shown in FIG. 5) of the base 34 from the lower part of the manifold 28. In the case of the structure utilizing the outlet ports 74, 76, for example, when the base 34 is formed (molded), openings are formed in a roughly elliptically shaped expanded portion 78 of the narrow side surface of the base 34, wherein couplings are connected to the openings. Further, it goes without saying that a base 34 can be manufactured in which couplings can be connected to all of the outlet ports 66, 68 and 74, 76.

The valve 12 is equipped with a plurality of ports (not shown) that communicate with the flow passages 52, 54, 56, 58, 62, 64 when the valve 12 is fixed in the base 34. The ports communicate respectively with a pilot valve (not shown) and a main valve (not shown) disposed in the valve 12. The valve 12 is a so-called pilot solenoid valve, wherein by means of a solenoid (not shown) therein, the pilot valve is switched and driven, and the main valve is switched and driven by means of the pilot air pressure supplied via the pilot valve.

In the valve 12, the pilot valve turns ON and OFF the supply of pilot air to the main valve, which is supplied from the pilot supply flow passage 42 of the manifold 28 and via the flow passage 52. The pilot air, after the main valve is driven, is discharged to the pilot discharge flow passage 44 through the flow passage 54 (see FIG. 13). Further, in the valve 12, the main valve selectively supplies air (pressure fluid), which is supplied from the supply flow passage 46 of the manifold 28 and via the flow passage 56, to each of the flow passages 62, 64.

Stated otherwise, in the valve 12, the air supplied from the supply flow passage 46 is subjected to a switching control, in accordance with controlling driving of the main valve by the pilot air, wherein air is selectively supplied to the outlet port 66 or the outlet port 68. As a result, the air, which defines a pressure fluid delivered to a fluid pressure driven device connected through the couplings 70, 72 and piping (not shown), is appropriately supplied from the outlet ports 66, 68. In this case, air (exhaust) that is returned from the fluid pressure driven device is discharged from the valve 12 to the discharge flow passage 48 of the manifold 28 via the flow passages 58, 60.

Incidentally, the solenoid that is contained within the valve 12 is driven electrically. In this case, as shown in FIGS. 4 and 5, the valve 12 is affixed inside the base 34, and a connector 82 disposed on a lower part of the valve 12 serves to supply electricity to the solenoid from the substrate 36, as a result of being connected to a connector 84 of the substrate 36. That is, the valve 12 is plugged in and thereby connected to the substrate 36.

Substrates 36 are arranged substantially at the same position also in the second base block 18 and in the control block 22. More specifically, by respectively connecting together the terminals 86*a*, 86*b* that are disposed on both ends of the lower surface of each of the substrates 36, each of the substrates 36 is electrically connected to the power source terminals 88 of the control block 22, and accordingly, supply of electricity to the solenoids is enabled.

The valve 12 constructed as described above is inserted into the interior of the base 34 from the opening 38, installed in the space 34*a* at an upper side partitioned by the center frame 50, and reliably fixed in the base 34 by two fitting screws (screws) 90, 90 together with the cover 40. In addition, the cover 40 sandwiches a gasket 92, which serves as a seal member, with respect to an upper surface of the base 34 at a border region thereof defined by the opening 38, and is attached by fixing screws 94, whereby the valve 12 is hermetically sealed inside of the base 34. In this case, the fixing screws 94 pass through holes 40*a*, 40*a* and 92*a*, 92*a* formed at both end sides of the cover 40 and the gasket 92, and are threaded into engagement with female threads 98, 98 on the upper surface of the base 34 via washers 96.

A manual switch 99 constructed so as to enable pressing of a switch 97 disposed on the upper surface of the valve 12 is disposed on the upper surface of the cover 40. The manual switch 99 serves as a switch for allowing manual control of the valve 12.

Figure 6A:
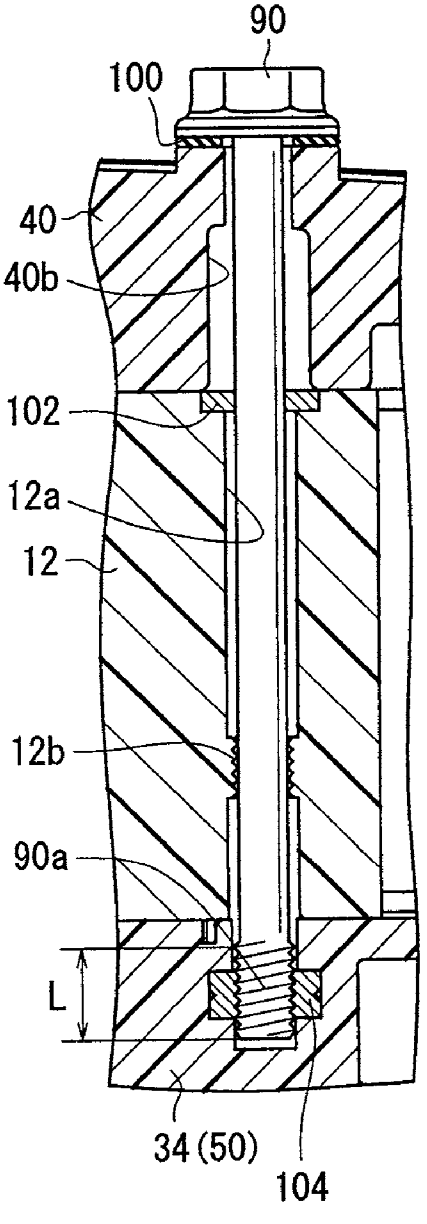
FIG. 6A is a cross sectional view with partial omission taken along line VIA-VIA of FIG. 4.
Figure 6B:
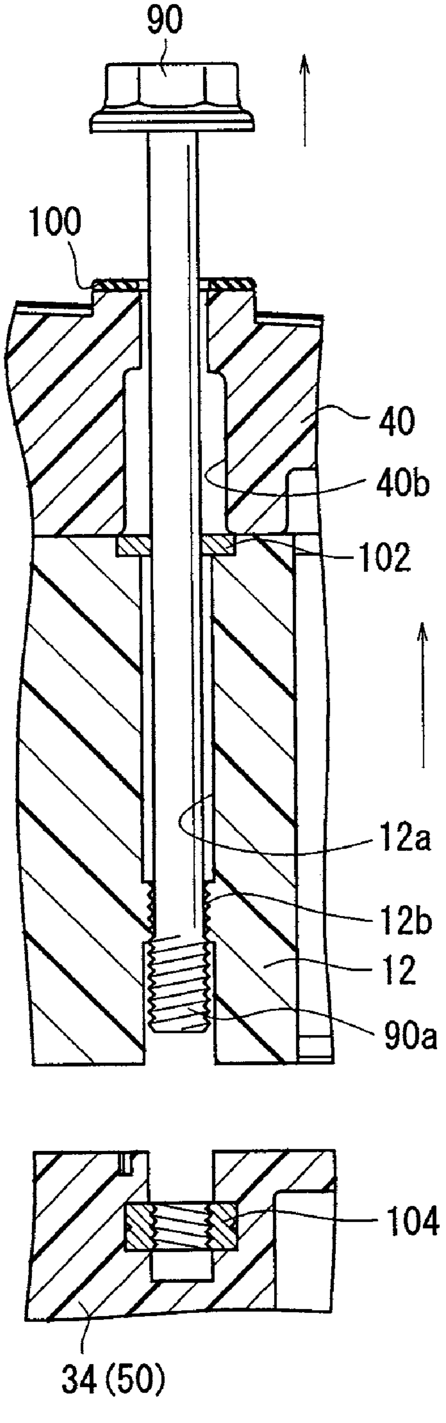
FIG. 6B is a cross sectional view with partial omission, showing a state in which a valve and a cover are extracted from the base illustrated in FIG. 6A.

With reference primarily to FIGS. 5 to 6B, the structure by which the valve 12 is attached to and detached from the base 34 shall be explained.

As shown in FIG. 6A, the fitting screws 90 have lengths, which are capable of being inserted through the cover 40 and the valve 12 and reaching to the center frame 50 of the base 34. Screw portions 90*a* are formed over a predetermined length portion L at the tip ends of the fitting screws 90, whereas the fitting screws 90 are otherwise cylindrically rod shaped from the screw portions 90*a* to the lower surface of the head portions thereof.

The fitting screws 90 are inserted through holes 40*b* disposed in the cover 40, as well as through holes 12*a* disposed in the valve 12, which are coaxially aligned with the holes 40*b*, and are threaded into female threads (nuts) 104 disposed in the base 34 (i.e., in the center frame 50). At this time, the fitting screws 90 are screw-engaged with the female threads 104 in a state such that gaskets 100 serving as seal members are gripped by the fitting screws 90 on the upper surface of the cover 40, and washers 102 are gripped between the valve 12 and the lower surface of the cover 40. Accordingly, as shown in FIG. 6A, the cover 40 and the valve 12 are reliably fixed with respect to the base 34.

Incidentally, when maintenance operations are performed, for example, to replace the valve 12 with a new valve, it is necessary to take out the valve 12 from a state in which it is installed in the base 34. In this case, with the valve apparatus 10 of the present embodiment, the width of the base 34 is extremely small, and therefore it may be difficult and troublesome for an operator to remove the valve 12 from the opening 38 of the base 34 by means of the fingers. Furthermore, because the valve apparatus 10 is of a water-resistant structure, wherein the respective structural components of the first base block 14 and the like are connected through gaskets 32, dismantling the valve apparatus 10 per se simply for the purpose of removing the valve 12 causes lowering of the water-resistant properties of the valve apparatus 10, and thus is undesirable.

Thus, in the case of the present embodiment, a portion of the inner circumferential surface that makes up the hole 12*a* of the valve 12 is formed with female threads 12*b* therein, with which a screw portion 90*a* of the fitting screw 90 is capable of threaded engagement (see FIG. 6A). Stated otherwise, the valve 12 is constructed such that when the fitting screw 90 is threaded and attached with the female threads 104, the screw portion 90*a* is inserted inside the hole 12*a*, whereupon the screw portion 90*a* is first threaded through the female threads 12*b*, located at an intermediate position, and after having passed through the female threads 12*b*, the screw portion 90*a* is then threaded into the female threads 104.

Accordingly, when the fitting screw 90 is unthreaded and the valve 12 is taken out from the opening 38, as shown in FIG. 6B, after the screw portion 90*a* has been unthreaded from the female threads 104 and the fitting screw 90 is lifted upwardly, the upper end side of the screw portion 90*a* becomes caught on the female threads 12*b*. Consequently, by further pulling on and lifting the installation screw 90 in a state in which the screw portion 90*a* is caught upon the female threads 12*b*, the valve 12 is lifted together with the cover 40, and ultimately, the valve 12 can easily be taken out from the base 34.

In this way, in the valve apparatus 10 of the present invention, by keeping the fitting screw 90 captive within the valve 12, a structure is obtained by which the valve 12 can easily be taken out using the fitting screw 90.

The second base block 18, which is connected with respect to the first base block 14 in the aforementioned structure, has substantially the same outer shape and structure as the first base block 14. Accordingly, structural elements thereof that are identical or similar to those of the first base block 14 are designated by the same reference numerals, and detailed explanations of such features shall be omitted throughout the descriptions below.

As shown in FIG. 1, the second base block 18 has a narrow width, which is somewhat narrower than that of the first base block 14 in the connecting direction (width direction) of the base blocks. The valve 16 installed inside of the second base block 18 also has a smaller set flow rate switching tolerance, and is constructed with a somewhat narrower width (smaller size) than the valve 12 installed inside of the first base block 14.

Accordingly, the second base block 18 includes a base 106, valve 16 and cover 108, which are somewhat narrower in width than the base 34, valve 12 and cover 40. Otherwise, apart from having couplings 110, 112, with set diameters somewhat smaller than those of the couplings 70, 72 corresponding to the reduced amount of flow rate switching performed thereby, the second base block 18 is constructed basically the same as the first base block 14.

The control block 22 is supplied with power through the power source terminals 88 from an unillustrated power source, and makes up a control unit that controls various types of valve apparatuses 10 through the control substrate 20. The control block 22, apart from being wider than the first base block 14 in the widthwise direction, is substantially the same in terms of the outer shape thereof as the first base block 14, although a cover 40 or the like is not provided, since an opening on the upper surface thereof is not necessary.

The control block 22 thus constructed has a substrate 36 installed therein, which is electrically connected to the control substrate 20, and further, by connecting the terminals 86*a* thereof with the terminals 86*b* of the substrate 36 of the second base block 18, the valves 12, 16 installed inside of the first and second base blocks 14, 18 can be driven and controlled.

Figure 3:
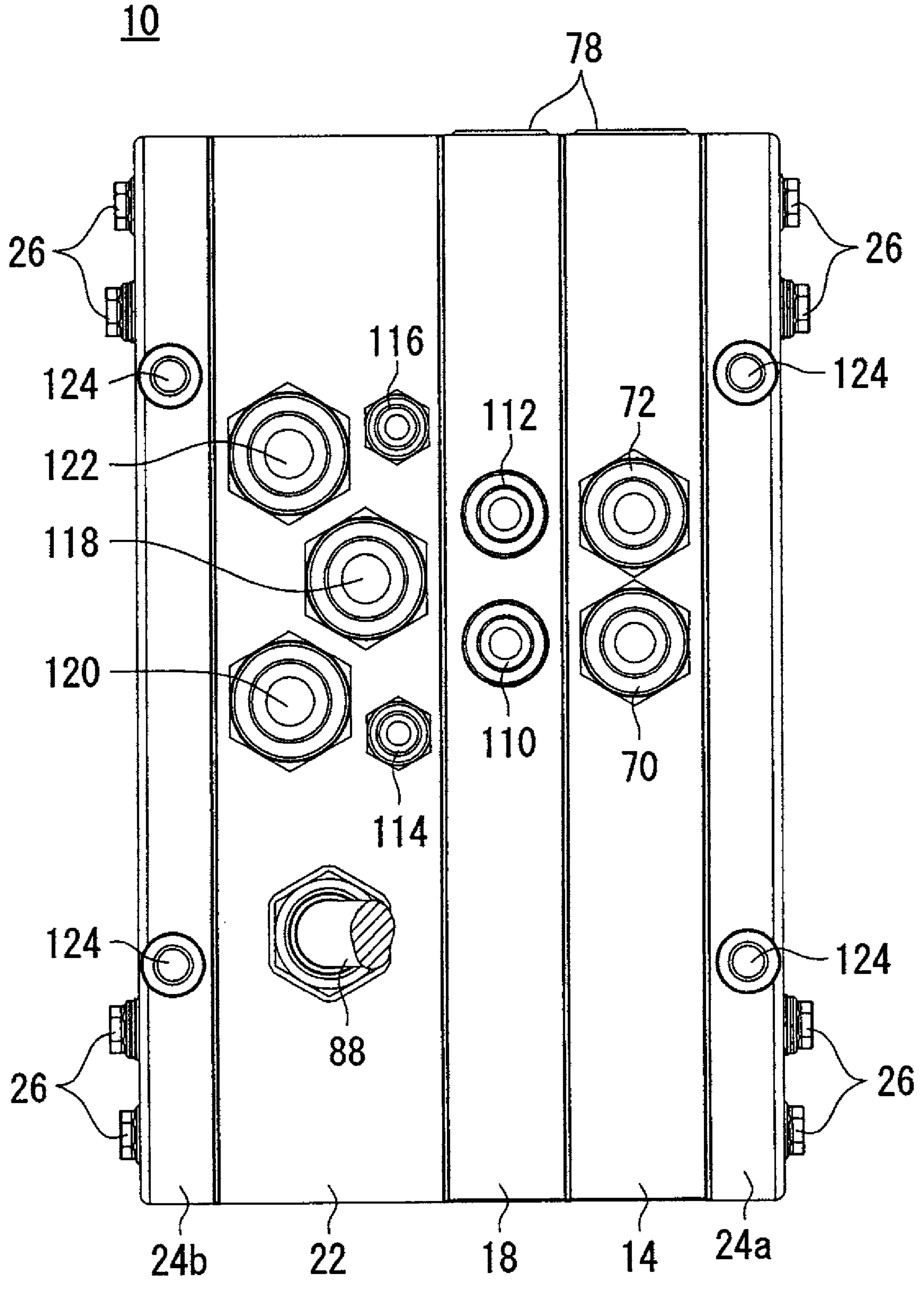
FIG. 3 is a bottom plan view of the valve apparatus shown in FIG. 1.

Furthermore, plural flow passages (not shown) that communicate with the supply flow passage 46, etc., constituting the manifold 28 are included in the control block 22. The respective flow passages also communicate with plural ports (not shown) that open on the lower surface side of the control block 22. As shown in FIG. 3, two small diameter couplings

114, 116 and three larger diameter couplings 118, 120, 122 are connected to each of these ports.

The coupling 114 communicates with the pilot supply flow passage 42, and is connected to unillustrated piping from an unillustrated pilot air supply source (e.g., an air pump). Further, the coupling 116 communicates with the pilot discharge flow passage 44.

The coupling 118 communicates with the supply flow passage 46, and is connected to unillustrated piping from an unillustrated air (pressure fluid) supply source (e.g., an air pump). Further, the couplings 120, 122 communicate with the pilot discharge flow passages 48, 48.

As shown in FIG. 1, the pair of end plates 24*a*, 24*b*, which sandwich therebetween the first base block 14, the second base block 18 and the control block 22 constructed as described above, are somewhat narrower in width than the first base block 14 in the widthwise direction, although they have roughly the same outer shape as the first base block 14. On the end plates 24*a*, 24*b*, the side surfaces thereof, which are opposite to the sides connected to the first base block 14, etc., have flat plate-like shapes (see FIGS. 1 and 2).

As shown in FIG. 2, respective pairs of legs 124, 124 are affixed to lower surfaces of the end plates 24*a*, 24*b*. The four legs 124 function as legs for the valve apparatus 10, for example, and fulfill a function to position the valve apparatus 10 in an upwardly offset manner, elevated a predetermined height from an installation surface.

As a result, the coupling 70 and the like can easily be connected to the lower surface of the valve apparatus 10. Moreover, the valve apparatus 10 can be arranged with a sufficient gap securely formed between the installation surface and the lower surface of the valve apparatus 10. Owing thereto, cleaning operations can easily be preformed on the lower surface of the valve apparatus 10, in addition to enabling water or detergent, which has collected on the lower surface, to be reliably removed by drying or wiping. Accordingly, water and the like is not retained on the lower surface of the valve apparatus, and thus the occurrence of bacterial propagation can reliably be avoided.

Figure 7:
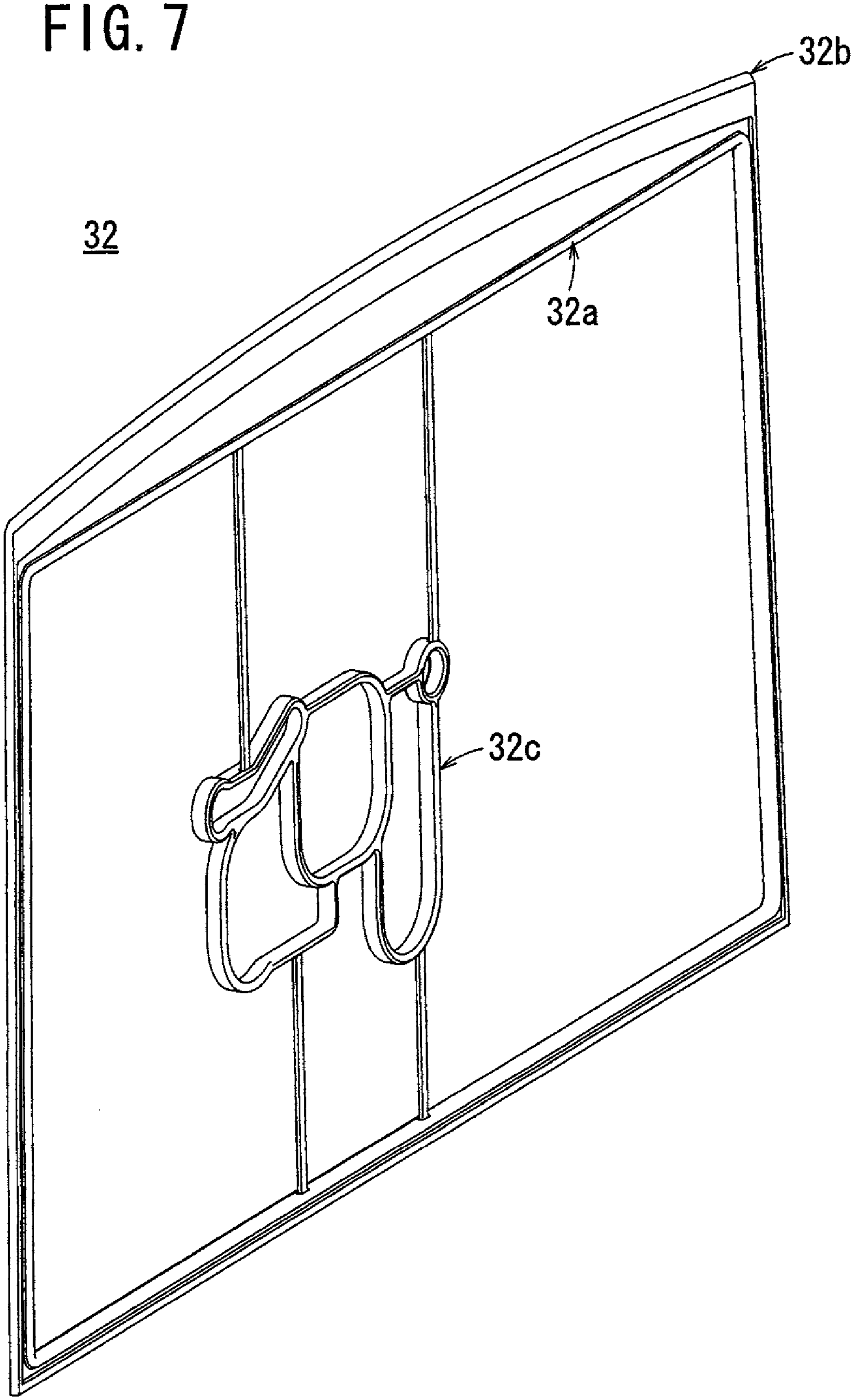
FIG. 7 is an expanded perspective view of a gasket illustrated in FIG. 2.

FIG. 7 is an enlarged perspective view of the gasket 32. As shown in FIG. 7, the gasket 32 includes a first seal portion 32*a* which is fitted into a groove 35 formed in the base 34 of the first base block 14, and a second seal portion 32*b* disposed on an outer side of the first seal portion 32*a*, which is formed to abut along an edge portion (corner) 33 that constitutes the outer shape of the side surface of the base 34. In this case, for fitting the first seal portion 32*a* into the groove 35, the first seal portion 32*a* is formed with a slightly greater wall-thickness than the second seal portion 32*b*, whereas the second seal portion 32*b* is formed with a generally flattened shape.

Furthermore, a generally thick-walled manifold seal portion 32*c*, which is fitted into grooves 37 formed so as to peripherally surround the respective flow passages making up the manifold 28, is formed on the inner side of the first seal portion 32*a*.

Concerning the water resistant structure provided by the gasket 32 in the valve apparatus 10 according to the present embodiment, with reference primarily to FIGS. 7 through 11, explanations shall be made taking as an example the gasket 32 that is gripped between the first base block 14 and the second base block 18.

Figure 8A:
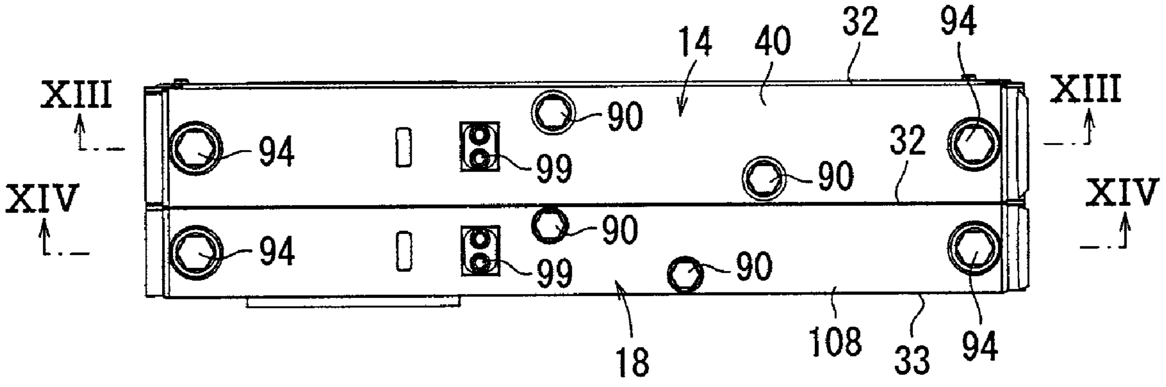
FIG. 8A is a plan view showing a state in which a first base block and a second base block are connected.
Figure 8B:
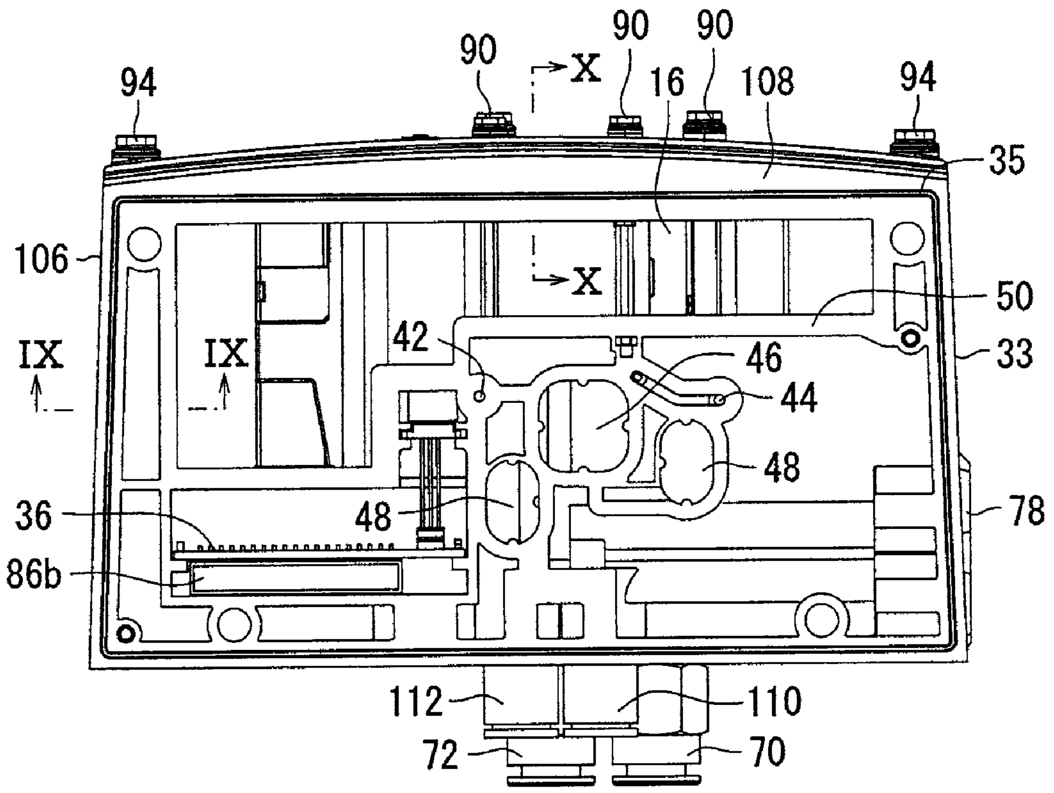
FIG. 8B is a front view of the first base block and the second base block shown in FIG. 8A.

As shown in FIGS. 7 through 8B, with the gasket 32 gripped between the first base block 14 and the second base block 18, the first seal portion 32*a* is fitted into the grooves 35 formed respectively in the bases 34, 106, wherein the second seal portion 32*b* comes into intimate contact with the edge portions 33 that make up the outer shapes of the bases 34, 106. In addition, the manifold seal portion 32*c* is fitted into the grooves 37 formed surrounding the respective manifolds 28.

Figure 9:
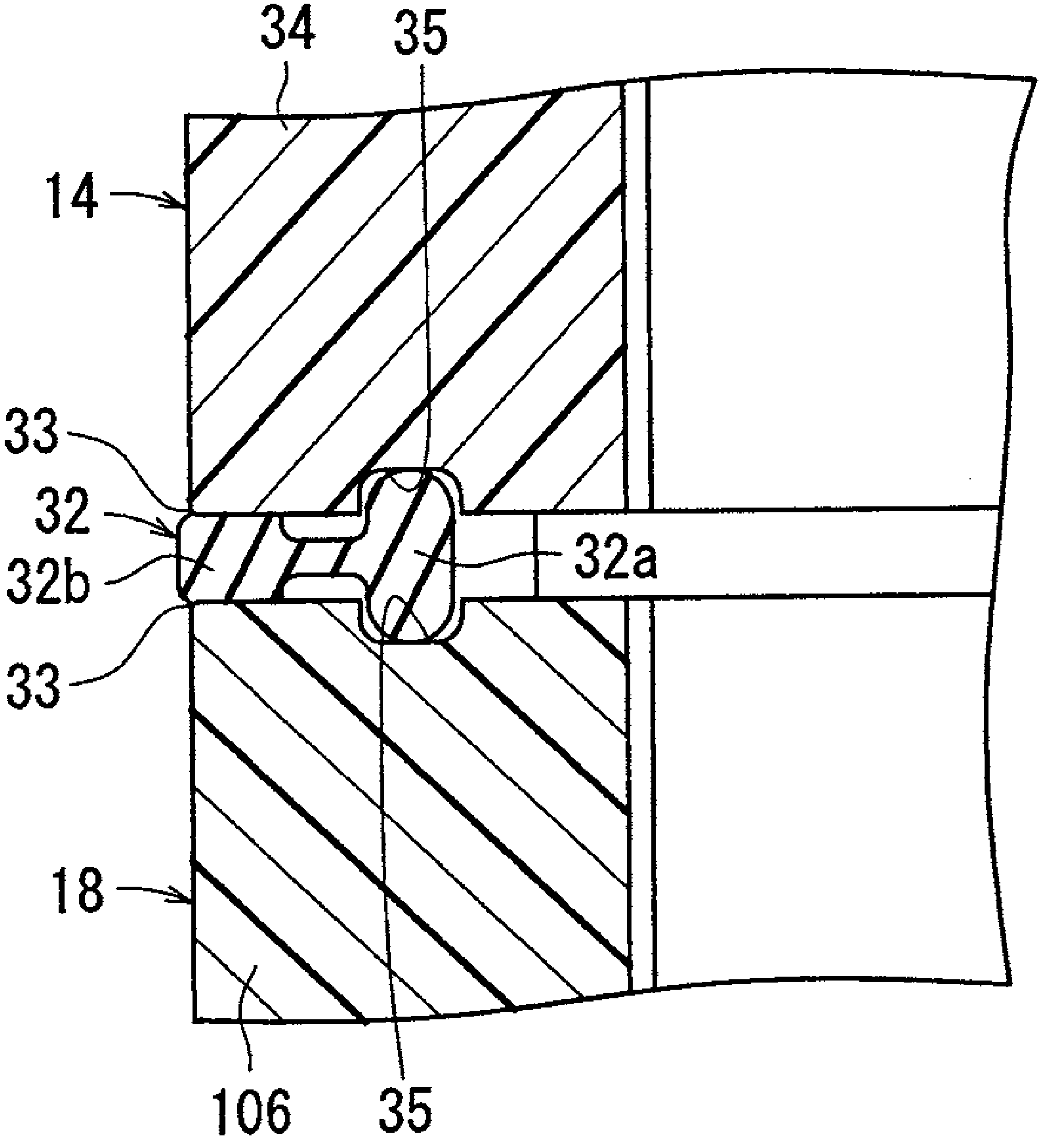
FIG. 9 is a cross sectional view with partial omission taken along line IX-IX in FIG. 8B.
Figure 10:
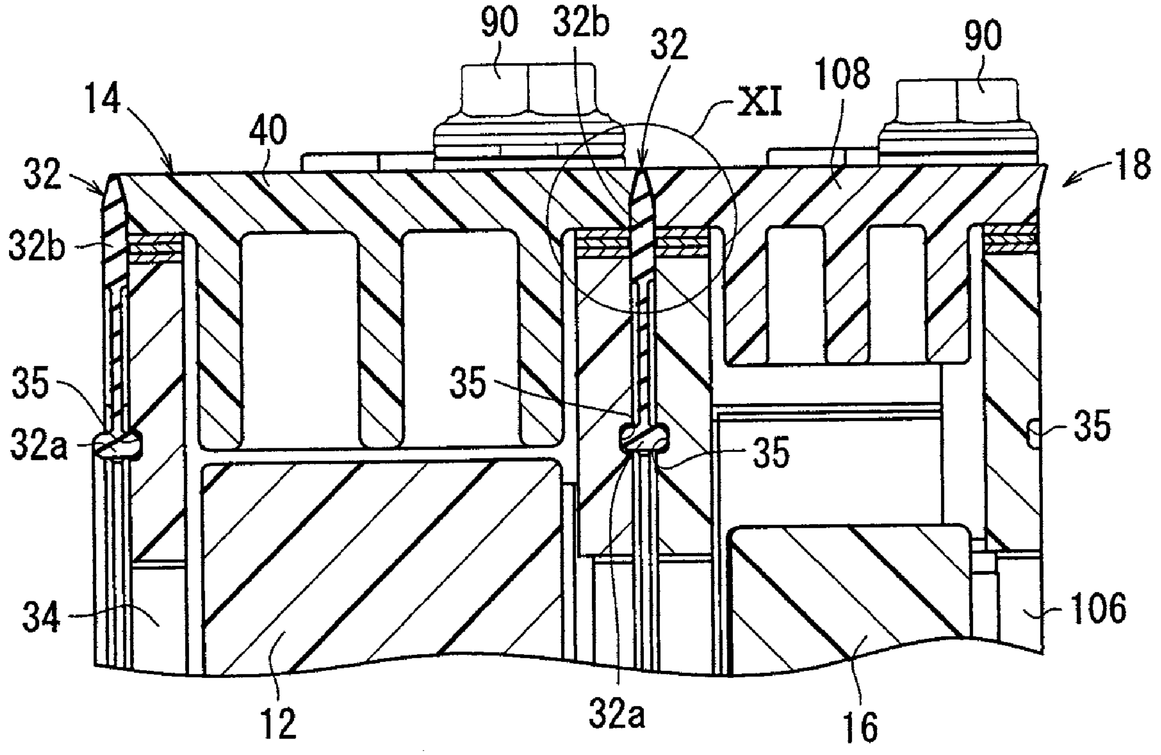
FIG. 10 is a cross sectional view with partial omission taken along line X-X in FIG. 8B.

As shown in FIGS. 9 and 10, at the sides and upper portion of the connecting portions of the first base block 14 and the second base block 18, the first seal portion 32*a* that is fitted into the groove 35 prevents the ingress of water, detergent or the like to the interior of the first base block 14 and the second base block 18. Furthermore, on the outer side (outer surface) of the first seal portion 32*a*, the second seal portion 32*b* comes into intimate and tight contact at the edge portions 33 of the base 34 and the base 106, making the water resistance thereof even higher. Further, water resistance is developed on the lower portions of the first base block 14 and second base block 18 as well by the gasket 32, in a similar manner to the aforementioned sides.

In this case, at the sides and lower portions of the first base block 14 and the second base block 18, as can be comprehended from FIG. 9, the tip of the second seal portion 32*b* is maintained in a state where it projects slightly outwardly from the outer surface (externally formed surface) of the bases 34 and 106. As a result thereof, a recess that is sunken inwardly from the outer surface is not formed by the gasket 32, which is gripped between the base 34 and the base 106, thus making it possible to reliably avoid the accumulation and retention of water or detergent, as well as the occurrence of bacterial propagation or the like. It is also acceptable if the tip portion of the second seal portion 32*b* is made substantially flush with the outer surface of the bases 34 and 106.

Figure 11:
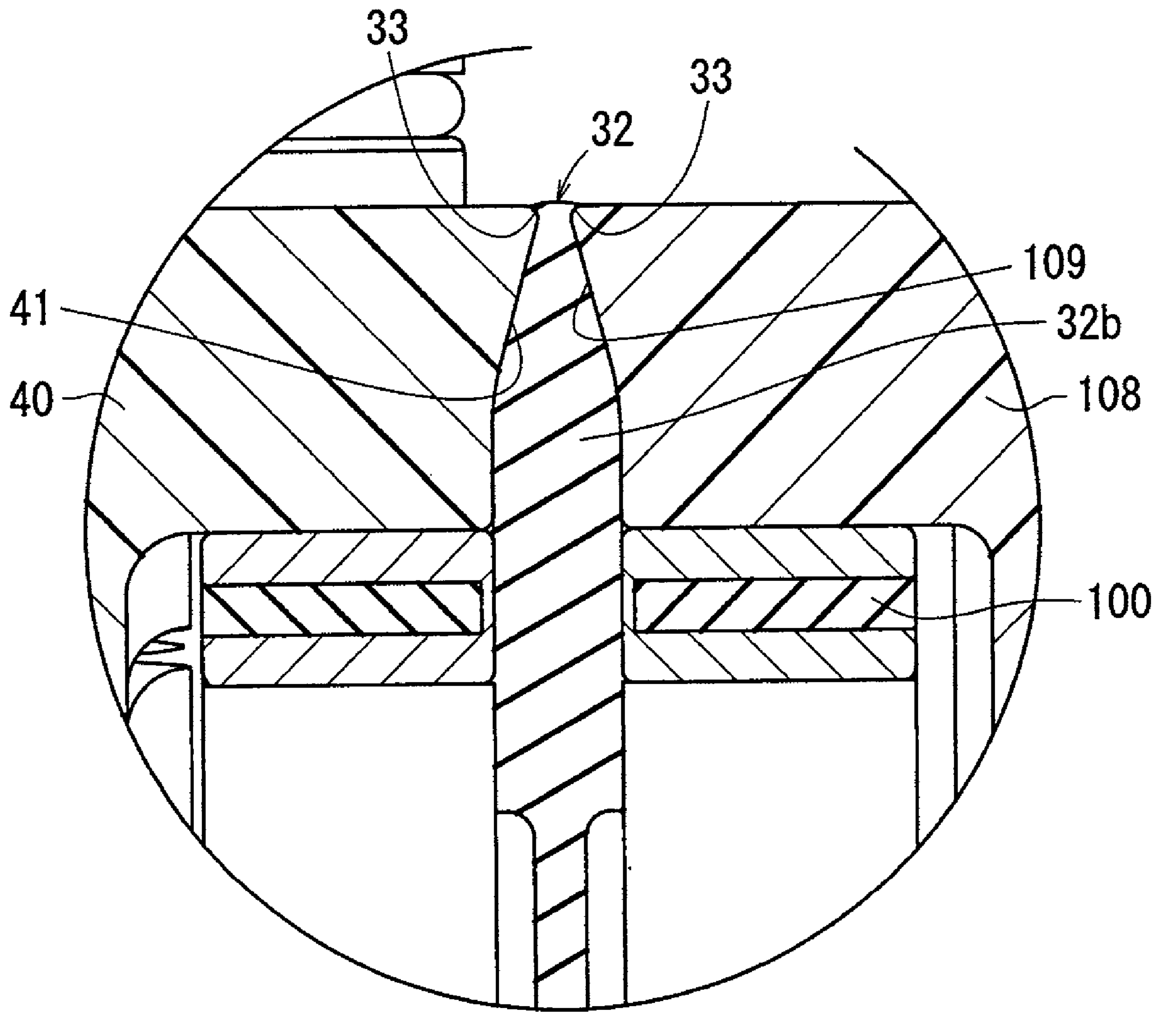
FIG. 11 is an expanded cross sectional view with partial omission showing the portion surrounded by the circle XI in FIG. 10.

On the other hand, as shown in FIGS. 10 and 11, at the upper portion of the first base block 14 and the second base block 18, the second seal portion 32*b* is formed with a taper, which becomes narrower in width toward the tip portion thereof. Furthermore, at the side surfaces of the covers 40 and 108 that contact the second seal portion 32*b*, tapered portions 41, 109 are formed, which expand in width toward the outer surface sides thereof. In this case, as can be comprehended from FIG. 11, the tapered tip of the second seal portion 32*b* is retained in a state such that it projects slightly outwardly from the outer surface of the bases 34 and 106. As a result, similar to the case of the sides shown in FIG. 9, also on the upper portions of the first base block 14 and the second base block 18, a recess is not formed by the gasket 32 between the cover 40 and the cover 108, so that accumulation and retention of water or detergent, as well as the occurrence of bacterial propagation, can reliably be avoided. Further, in this case as well, it is also acceptable if the tip portion of the second seal portion 32*b* is made substantially flush with the outer surface of the covers 40 and 108.

In this manner, the valve apparatus 10 can be made small in size by connecting together, while placing in intimate contact, each of the blocks of the first base block 14, etc. Notwithstanding, since accumulation and retention of liquids on the outer surfaces thereof can be prevented, propagation of unwanted bacteria can be avoided.

Figure 12:
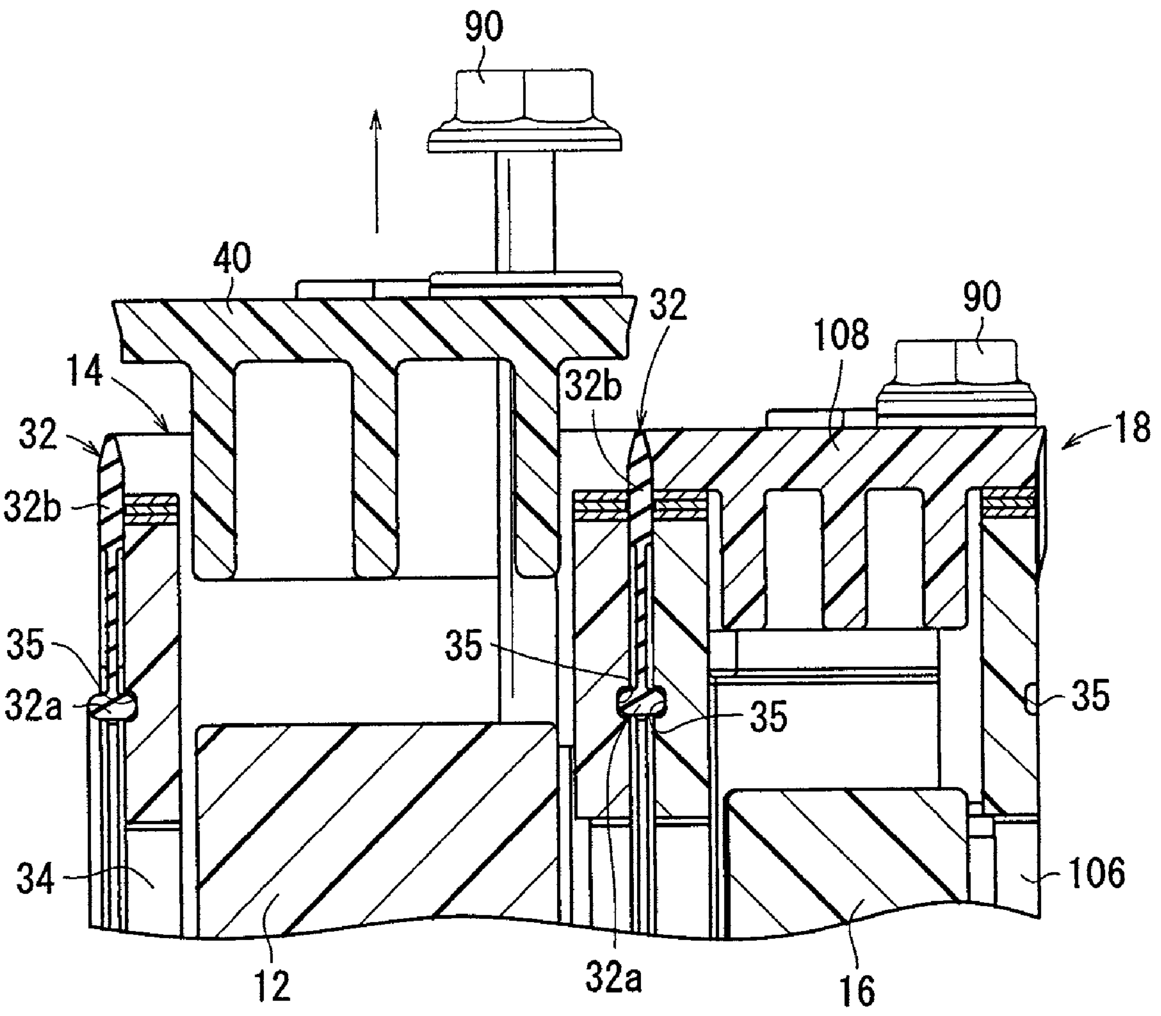
FIG. 12 is a cross sectional view with partial omission showing a state in which the cover is taken out from the first base block and the second base block shown in FIG. 10.

Incidentally, as described above, tapered portions 41, 109 are formed, which expand in width toward the outer surface sides thereof, on the upper portions of the first base block 14 and the second base block 18, that is, on the covers 40, 108. Also, a taper, which narrows in width toward the outer surface side, is formed on the second seal portion 32*b* at the upper portion of the gasket 32 (see FIG. 11). As a result, as shown in FIG. 12, even when the first base block 14 and the second base block 18 are connected with the gasket 32 sandwiched therebetween, when the covers 40, 108 are attached or removed, abutment or separation between the tapered portions 41, 109 and the tapered shape of the second seal portion 32*b* occurs smoothly. Accordingly, in the valve apparatus 10, even in a state in which the various structural elements of the first base block 14, etc., are interconnected, attachment and removal of the covers 40, 108 can easily be carried out, and more specifically, the valves 12, 16 can easily be inserted and taken out.

Next, basic operations of the valve apparatus 10, constructed as indicated above, shall be described.

In the valve apparatus 10 having the first base block 14 and the second base block 18 interconnected, initially, electric lines from an electrical source and from a controller for a food processing device or the like (not shown) are connected to the control block 22 through the power source terminals 88. Next, air (pressure fluid) is supplied from an unillustrated air supply source to the coupling 118 of the control block 22, and pilot air from an unillustrated pilot air supply source is supplied to the coupling 114. Specifically, the air is supplied to the supply flow passage 46 of the manifold 28, and the pilot air is supplied to the pilot supply flow passage 42.

Next, the supplied electricity and control signals are transmitted from the control substrate 20 of the control block 22 to the solenoids (not shown) installed in the valves 12, 16 of the first base block 14 and the second base block 18, via terminals 86*a*, 86*b* of the respective substrates 36. When this is done, in each of the valves 12, 16, the pilot valves (not shown) are subject to switching control by the solenoids, whereby pilot air supplied to the valves 12, 16 from the pilot supply flow passage 42, and via the flow passage 52, is supplied to a given main valve (not shown), thus also subjecting the main valve to switching control.

By means of the switching control of the main valves by the pilot air, in the valve apparatus according to the present embodiment, air from the supply flow passage 46 of the manifold 28 can be appropriately supplied to fluid pressure driven devices (not shown), which are connected respectively to the first base block 14 and the second base block 18 and which define the supply destinations for the air.

Figure 14:
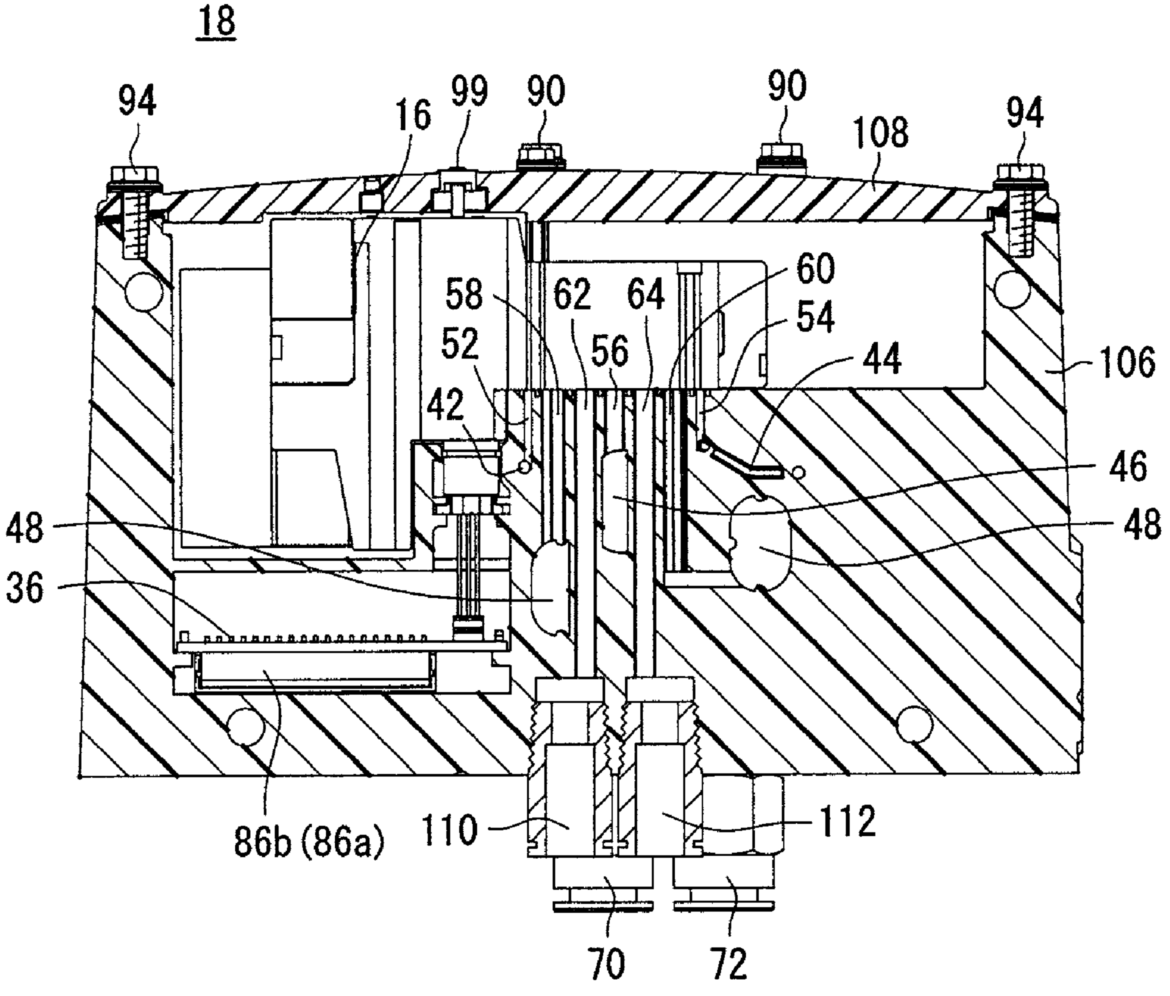
FIG. 14 is a cross sectional view with partial omission taken along line XIV-XIV in FIG. 8A.

More specifically, in the first base block 14, air from the supply flow passage 46 of the manifold 28 is made to flow selectively through the flow passages 62, 64 by the main valve of the valve 12 under the control of the control substrate 20 installed in the control block 22, and flows through the couplings 70, 72 to the fluid pressure driven device connected to the first base block 14 (see FIG. 13). Similarly, in the second base block 18, air from the supply flow passage 46 of the manifold 28 is made to flow selectively through the flow passages 62, 64 by the main valve of the valve 16, and flows through the couplings 110, 112 to the fluid pressure driven device connected to the second base block 18 (see FIG. 14).

In the first base block 14 and the second base block 18, pilot air that has been used for switching control of the main valve, and surplus pilot air, is discharged to the outside through the coupling 116 of the control valve 22, after flowing from the flow passage 54 to the pilot discharge flow passage 44 of the manifold 28. On the other hand, in the first base block 14 and the second base block 18, the remaining air (exhaust air) from each of the fluid pressure driven devices, after flowing from the flow passages 58, 60 to the discharge flow passages 48, 48 of the manifold 28, is discharged to the outside through the couplings 120, 122 of the control block 22.

With the above-described embodiment, a structure has been explained in which one of each of the first base block 14 and the second base block 18 constituting the valve apparatus 10 is used, however, the invention is not limited to such a structure. Multiple units of the first base blocks 14 and the second base blocks 18 can be connected together simultaneously. Further, it is not required that both blocks of the first base block 14 and the second base block 18 must be used.

Further, in the valve apparatus 10, it goes without saying that the structures of the valves 12, 16, and the number of flow passages constituting the manifold 28, are not limited to the structures shown in the above-described embodiment.

Furthermore, in the above-described embodiment, an explanation was given of an external pilot type, which utilized the pilot supply flow passage 42. However, the invention is not limited to this structure. An internal pilot type, which uses as pilot air the air (pressure fluid) that flows through the supply flow passage 46, may also be provided.

In the above embodiment, as shown in FIG. 7, the gasket 32 has been exemplified by a first seal portion 32*a*, a second seal portion 32*b* and a manifold seal portion 32*c*, all of which are formed together in an integral manner. However, it is also acceptable to form these elements separately in two parts, for example, such that the manifold seal portion 32*c* forms a separate structure with respect to the first seal portion 32*a* and the second seal portion 32*b*.

Further, for example, the substrate 36 and the terminals 86*a* (86*b*) can be placed vertically along a side surface that lies substantially perpendicular to the cover 40 in the base 34 of the first base block 14. The same also holds true for the second base block 18, etc.

Moreover, apart from being disposed in the control block 22, for example, the couplings 114, 116, as well as other couplings or the like, can also be disposed in the end blocks 24*a* (24*b*). In addition, ventilation ports and the like, or other types of couplings may also be added to the control block 22, etc.

Finally, the invention is by no means limited to the above-described embodiment, but rather, various other structures can naturally be adopted therefor, without departing from the essence and gist of the present invention.

What is claimed is:

1. A valve apparatus comprising:

a plurality of blocks having flow passages formed therein, wherein by connecting together side surfaces of each of the blocks so that the surfaces thereof mutually oppose one another, said flow passages of each of the blocks communicate with each other, and wherein a valve communicating with said flow passages is installed internally in at least one of said plurality of blocks;

a seal member gripped between respective connecting parts of each of said blocks, said seal member comprising a first seal portion fitted into a groove formed along an exterior shape of each side surface of the blocks between which the seal member is gripped, and a second seal portion disposed on an outer side of said first seal portion and abutting with an edge portion defining said exterior shape; and a cover detachably disposed on one side surface of the block in which said valve is installed, for closing an opening through which said valve is inserted and extracted, wherein said seal member is held in a state of being flush with or protruding with respect to outer surfaces of the blocks that are positioned on both sides of said seal member, and wherein a part of said second seal portion that contacts said cover is formed in a tapered shape that narrows in width toward an outer surface side thereof.

2. The valve apparatus according to claim 1, wherein a tapered portion, which expands in width toward an outer surface side thereof, is formed in a side surface of said cover that contacts said seal member.

3. The valve apparatus according to claim 1, further comprising:

a hole disposed in said cover;

a hole disposed in said valve, which is aligned coaxially with respect to the hole of said cover; and a screw for fixing said valve to said block by threaded engagement with female threads provided in said block, after the screw has been inserted from an upper surface side of the hole of said cover, and inserted through each of the holes of said cover and said valve, wherein a screw portion is formed over a predetermined length from an end of said screw, and wherein female threads, into which the screw portion formed in said screw can be threaded, are formed in at least a portion of an inner circumferential surface of the hole disposed in said valve.

4. The valve apparatus according to claim 3, wherein a tapered portion, which expands in width toward an outer surface side thereof, is formed in a side surface of said cover that contacts said seal member.

5. A valve apparatus comprising:

a plurality of blocks having flow passages formed therein, wherein by connecting together side surfaces of each of the blocks so that the surfaces thereof mutually oppose one another, said flow passages of each of the blocks communicate with each other, and wherein a valve communicating with said flow passages is installed internally in at least one of said plurality of blocks;

a seal member gripped between respective connecting parts of each of said blocks; and a cover detachably disposed on one side surface of the block in which said valve is installed, for closing an opening through which said valve is inserted and extracted, wherein said seal member is held in a state of being flush with or protruding with respect to outer surfaces of the blocks that are positioned on both sides of said seal member, and wherein a tapered portion, which expands in width toward an outer surface side thereof, is formed in a side surface of said cover that contacts said seal member.

6. The valve apparatus according to claim 5, further comprising:

a hole disposed in said cover;

a hole disposed in said valve, which is aligned coaxially with respect to the hole of said cover; and a screw for fixing said valve to said block by threaded engagement with female threads provided in said block, after the screw has been inserted from an upper surface side of the hole of said cover, and inserted through each of the holes of said cover and said valve, wherein a screw portion is formed over a predetermined length from an end of said screw, and wherein female threads, into which the screw portion formed in said screw can be threaded, are formed in at least a portion of an inner circumferential surface of the hole disposed in said valve.

7. The valve apparatus according to claim 6, wherein a tapered portion, which expands in width toward an outer surface side thereof, is formed in a side surface of said cover that contacts said seal member.

8. A valve apparatus comprising:

a plurality of blocks having flow passages formed therein, wherein by connecting together side surfaces of each of the blocks so that the surfaces thereof mutually oppose one another, said flow passages of each of the blocks communicate with each other, and wherein a valve communicating with said flow passages is installed internally in at least one of said plurality of blocks;

a seal member gripped between respective connecting parts of each of said blocks;

a cover detachably disposed on one side surface of the block in which said valve is installed, for closing an opening through which said valve is inserted and extracted;

a hole disposed in said cover;

a hole disposed in said valve, which is aligned coaxially with respect to the hole of said cover; and a screw for fixing said valve to said block by threaded engagement with female threads provided in said block, after the screw has been inserted from an upper surface side of the hole of said cover, and inserted through each of the holes of said cover and said valve, wherein said seal member is held in a state of being flush with or protruding with respect to outer surfaces of the blocks that are positioned on both sides of said seal member.

9. The valve apparatus according to claim 8, wherein a tapered portion, which expands in width toward an outer surface side thereof, is formed in a side surface of said cover that contacts said seal member.

* * * * *